United States Patent Office 2,980,502

Patented Apr. 18, 1961

2,980,502

STRONTIUM CHROMATE FROM BRINE

Robert D. Goodenough and Vernon A. Stenger, Midland, Mich., assignors to The Dow Chemical Company, Midland, Mich., a corporation of Delaware No Drawing. Filed Jan. 22, 1959, Ser. No. 788,254

7 Claims. (Cl. 23—56)

The invention relates to the production of strontium chromate from solutions containing strontium salts and particularly from brines containing strontium salts intermixed with other salts especially calcium chloride.

$SrCrO_4$ is presently produced from its ores. Neither the method employed for producing $SrCrO_4$ therefrom nor the quality of the $SrCrO_4$ produced is fully satisfactory.

Heretofore, no method has been known for the direct conversion of strontium values, from brines containing both strontium and calcium salts, to $SrCrO_4$ which is satisfactory.

Not only has the recovery of strontium values from aqueous solutions, e.g., natural brines which also contain alkali and/or other alkaline earth metal salts, as the chromate been a continuing problem, but the recovery of the strontium values in any form has been a continuing problem. A number of attempts have been made to provide a practical method of attaining this end but have not been fully successful for one or more reasons. Among such reasons for failure to provide a practical method for recovering Sr from brines have been the time-consuming requirements for repeated evaporation, crystallization, and filtration steps, and the lack of purity of the product produced, particularly freedom from contamination by barium compounds.

One of the attempts to provide a method of recovering strontium values from mixed chloride brines is the method of recovering $SrCl_2$ described in U.S. Patent 1,831,251 to Jones. According to the method of that patent, brine is concentrated by evaporation to salt out NaCl, if present, which is then separated by filtration. By cooling the resulting filtrate to about 60° C., $MgCl_2$ is removed as, if present, the complex $CaCl_2 \cdot 2\,MgCl_2 \cdot 12\,H_2O$ salt known as tachydrite leaving a large portion of the $CaCl_2$ and the $SrCl_2$. After filtering out the tachydrite, the filtrate is concentrated by further evaporation to a gravity of about 49° Baumé measured at 46° C. and thereafter cooled to about 31° C. to separate out crystals containing $CaCl_2$ and about 60 percent of the strontium values. The thus separated crystals are later heated under controlled conditions to a temperature which causes a portion of the $CaCl_2$ to flow away leaving $SrCl_2$ in higher concentration. The $SrCl_2$ thus produced still contains substantial portions of $CaCl_2$.

Although the method of the Jones patent was tedious and exacting and the strontium salts produced contained substantial percentages of contaminants, particularly $CaCl_2$, it represented an improvement over known methods and has not been substantially improved upon since its issuance.

As a result of there being no satisfactory method of recovering strontium values from brines containing other salts, particularly a calcium halide, the leachate liquor remaining after the recovery of such other salts and containing the strontium salts was discarded as waste.

Strontium metal and its compounds have a number of uses which make the loss of the strontium salts from brines, particularly those being processed for other reasons, one of considerable economic importance. Among such uses are the preparation of pyrotechnics, pharmaceuticals, pigments, chemical reagents, drying compositions, special lubricants, and corrosion inhibitors in paint formulations, e.g., as a corrosion inhibitor in aluminum paint.

Strontium presently is largely obtained from celestite, which is a crude $SrSO_4$ ore, and from strontianite, which is a crude $SrCO_3$ ore. The strontium ores are not widely distributed in the world, e.g., celestite, the principal source, is largely mined in England. Therefore, in addition to the heavy costs of mining, crushing, and refining these ores, is added extraordinarily high shipping charges due to the shipment of a heavy product over long distances. Furthermore, strontium sulfate produced from ores is coarse, making it less desirable as a chemical reactant than finer particle strontium compounds. A still further disadvantage of strontium from ores is that it is contaminated by too high a percentage of barium to be directly usable in the preparation of pyrotechnics, pigments, flares, and chemical reagents. Prior to its use therefor, barium must be removed therefrom. A preferred strontium compound for a number of the above uses is $SrCrO_4$.

A need, therefore, exists for a method of obtaining strontium values from other sources than ores and particularly from brines and leachate or by-product brines from which certain other salts have been removed and converting such values into $SrCrO_4$.

Accordingly, the principal object of the invention is to provide an economically practical method of obtaining strontium values from aqueous solutions containing strontium salts and especially from brines which also contain other dissolved salts such as $CaCl_2$ and the like, intermixed therewith. A particular object of the invention is to provide a method of producing $SrCrO_4$ from such brines.

The method of attaining these and related objects will be made clear in the ensuing description and is particularly defined in the appended claims.

The invention is a method of recovering strontium values from aqueous solutions, e.g., natural brines or from such brines from which other salts containing strontium salts intermixed therewith have been crystallized and such crystallized salts thereafter have been leached to obtain a strontium-enriched leach liquor or leachate containing not over a molar ratio of Ca:Sr of 20:1 and preferably not over 7:1, and thereafter admixing with said leachate under controlled specific conditions, as hereinafter described, an aqueous solution of (1) a soluble chromate or (2) a soluble dichromate or chromic acid anhydride and an aqueous solution of an alkali metal hydroxide to precipitate strontium chromate, and thereafter separating the thus-produced strontium chromate.

Preferred chromates to employ in the practice of the invention are sodium chromate, ammonium chromate, potassium chromate, or magnesium chromate. Preferred dichromates to employ are sodium or potassium dichromate admixed with an aqueous solution of sodium hydroxide or potassium hydroxide which preferably is the hydroxide of the same metal as the dichromate employed, e.g., NaOH, with $Na_2Cr_2O_7$.

The reaction thought to take place when a chromate is added directly to the brine containing a strontium salt in accordance with the invention is illustrated by the following equation:

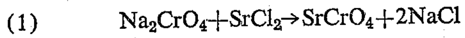

$$Na_2CrO_4 + SrCl_2 \rightarrow SrCrO_4 + 2NaCl \quad (1)$$

The amount of the chromate to employ in the practice of the invention may be from about 60 percent to 100 percent of the stoichiometric quantity required to react with the strontium present, but between 80 and 90 percent of the required quantity of the chromate is preferable because below this range the strontium loss becomes significant and above this range the $CrO_4$ loss becomes significant.

When a dichromate is employed in accordance with the invention, the reactions thought to take place are illustrated by the following equations:

(2) $Na_2Cr_2O_7 + 2NaOH \rightarrow 2Na_2CrO_4 + H_2O$ (3) $2Na_2CrO_4 + 2SrCl_2 \rightarrow 2SrCrO_4 + 4NaCl$ Equations 1 and 3 are the same proportionally. The recommended percentages of the stoichiometric quantity of $(CrO_4)$ necessary to react with the Sr present are the same regardless of whether the chromate is provided directly or is formed by the interaction of the dichromate with an alkali metal hydroxide. When the dichromate is employed, it is recommended that the corresponding hydroxide be present in an amount between about 90 and 120 percent of the stoichiometric quantity of NaOH required to react with the dichromate. The hydroxide is usually employed in an amount between about 100 and 110 percent of the quantity necessary to react with the dichromate. When the hydroxide is employed in amounts greater than 110 percent of the stoichiometric quantity, the percentage of strontium chromate produced is slightly lower. When employing the dichromate and the hydroxide, it is preferable that the two be intermixed thoroughly before addition to the strontium salt-containing brine. Adding the hydroxide and the dichromate directly to the brine, viz., internal mixing, produces lower yields than when they are intermixed prior to admixture with the brine, viz., external mixing and the mixture permitted time to react to substantial completion before adding it to the brine.

The temperature at which the aqueous solutions of the strontium salt or brine are admixed with the chromate or the dichromate and hydroxide may be any temperature between 25° and 110° C. but it has been found that a temperature of between 90° and 110° C. is preferred because the solubility of $SrCrO_4$ is less at the higher temperatures. The digestion period, or period to which reference is sometimes made as the dwell or residence time, should be between 1 and 2 hours or longer. Shorter digestion periods such as 15 minutes or 20 minutes have been found to produce acceptable results but it has been found that chromium losses and product impurity are appreciably reduced by increasing the digestion time up to an hour and a less pronounced but discernible reduction chromium loss was found to continue up to as long as two hours' digestion time. When the stoichiometric quantity of the chromate is on the order of 100 percent of that required to react with the strontium, the digestion period may be somewhat shorter than when the stoichiometric requirement is say only about 80 percent of that required to react with the strontium.

The strontium chromate product is removed from the reaction mixture by filtering and thereafter washing the precipitate with hot water. The washed precipitate is usually dried at between about 130° and 140° C. The product produced in accordance with the invention contains up to about 94 percent $SrCrO_4$. It usually contains traces of sodium and magnesium and may contain as much as 10 percent of $CaCrO_4$. It does not contain any barium, potassium or lithium which is detectable by flame spectrophotometry. The above stated maximum percentage of calcium chromate is definitely less than that usually found in strontium chromate precipitates formed from brine by known commercial methods.

Examples, illustrative of the invention, are set out hereinafter. The brine employed in all the examples set out hereinafter was leachate brine produced in the process of recovering other than strontium salts from an inland brine. The leachate brine was produced as a by-product as follows:

An inland brine was evaporated in an evaporator to the point at which most of the NaCl crystallized out of solution. The mother liquor thus produced, designated mother liquor No. 1, had the specific gravity and contained the salts, for which analyses were run, as set out under "Brine Analysis" below.

Mother liquor No. 1 was further evaporated and then desalted and cooled to 70° C. during which some tachydrite, $2MgCl_2 \cdot CaCl_2 \cdot 12H_2O$, crystallized out leaving the $SrCl_2$, KCl, and a substantial percentage of the $CaCl_2$ and $MgCl_2$. The specific gravity and percentages of salts for which analyses were run in mother liquor No. 2, are set out under "Brine Analysis" below.

Mother liquor No. 2 was then cooled to 28.5° C. at which temperature carnallite, $KCl \cdot MgCl_2 \cdot 6H_2O$, crystallized out with a substantial portion of the $SrCl_2$. Carnallite crystallizes out to some extent beween 93° and 0° C., but for practical purposes the range may be said to be between 65° and 25° C. The recommended range for crystallizing out the carnallite is below 32° C. for good crystallization action, but above 24.8° C. because below that temperature, $CaCl_2 \cdot 6H_2O$ begins to crystallize out.

The carnallite crystals containing the $SrCl_2$ were then washed with water, the water thus employed acquiring a certain salt content and herein referred to as leachate or leachate brine. The leachate had the specific gravity and contained the salts for which analyses were made in the percentage set out under "Brine Analysis" below. A portion of the leachate was recycled back into the process, but a substantial portion thereof, heretofore largely discarded, was employed herein as the brine source of strontium for the preparation of $SrCrO_4$ according to the invention. It had a calcium to strontium molar ratio of 2.7:1.

| | Brine Analysis in Percent by Weight | | |
|---|---|---|---|
| | Mother Liquor No. 1 | Mother Liquor No. 2 | Leachate Brine |
| Specific Gravity | 1.411 at 95° C. | 1.485 at 70° C. | 1.265 at 30° C. |
| $CaCl_2$ | 34.88 | 38.92 | 3.65. |
| $MgCl_2$ | 6.02 | 7.96 | 17.05. |
| KCl | 2.53 | 3.33 | 5.07. |
| NaCl | 1.25 | 0.85 | 2.31. |
| $SrCl_2$ | 0.75 | About 0.90 | 1.95. |

The first series of runs, the details of which are set out in the following paragraph, consisted of Examples 1–4. Examples 1, 2 and 3 show the effect of increasing the ratio of the quantity of NaOH to the stoichiometric quantity required to react with the $Na_2Cr_2O_7$. Example 4 is comparable to Example 1 except that the NaOH and the $Na_2Cr_2O_7$ aqueous solutions were intermixed externally before admixture with the strontium chloride-containing brine. By referring to Equations 2 anad 3 set out hereinabove, it will be observed that 2 moles of $SrCl_2$ are required to provide the stoichiometric requirement for reaction with 1 mole of $Na_2Cr_2O_7$.

The examples of the first series of runs was conducted as follows: 200 milliliter samples of brine were treated with 6.43 grams of sodium dichromate (equivalent to 6.80 grams of $SrCl_2$). The brine samples were heated to 100° C. and treated with various percentages of the stoichiometric quantities of sodium dichromate and sodium hydroxide required by Equations 2 and 3 under vigorous agitation. A 15 to 20 minute digestion period was allowed. After the digestion period, the samples were filtered in a Büchner funnel fitted with No. 52 Whatman paper. The precipitate was washed on the filter paper with 75 milliliters of hot distilled water. The filtrate plus the wash water were transferred to a flask and diluted to 500 milliliters. The filter cake obtained was dried at 130° C. for from 2 to 3 hours and thereafter analyzed. The results are set out in Table I below:

TABLE I

| Example No. | 1 | 2 | 3 | 4 |
|---|---|---|---|---|
| Brine, in ml | 200 | 200 | 200 | 200 |
| $SrCl_2$ in the brine, in gm | 6.80 | 6.80 | 6.80 | 6.80 |
| $Na_2Cr_2O_7 \cdot 2H_2O$ added, in gm | 6.43 | 6.43 | 6.43 | 6.43 |
| Mole ratio of $\frac{SrCl_2}{(Cr_2O_7)}$ | 1.99:1 | 1.99:1 | 1.99:1 | 1.99:1 |
| NaOH, 2 N, in ml | 21.6 | 23.8 | 25.9 | 21.6 |
| NaOH, in percent of stoichiometric | 100 | 110 | 120 | 100 |
| Manner of mixing $NaOH+Na_2Cr_2O_7$ | Internal | Internal | Interna | External |
| (a) Filtrate Analysis: | | | | |
| pH (diluted to 1 of filtrate to 2.5 of water) | 7.3 | 8.1 | 8.4 | 7.2 |
| $(Cr_2O_7)$ loss, in gm | 0.748 | 0.564 | 0.692 | 0.521 |
| $(Cr_2O_7)$ loss, in percent | 11.6 | 8.8 | 10.8 | 8.1 |
| $(SrCl_2)$ loss, in percent | 17.5 | 15.7 | 17.0 | 12.0 |
| Mole ratio of $\frac{SrCl_2}{(Cr_2O_7)}$ consumed [1] | 1.86:1 | 1.84:1 | 1.85:1 | 1.91:1 |
| (b) Filter Cake Analysis: | | | | |
| $CrO_3$, in percent | 49.5 | 48.9 | 47.7 | 48.9 |
| Ba, Li, K | Nil in all examples for which tested | | | |

[1] Calculated from determination in filtrate.

The ratio of strontium chloride to dichromate as set out in Table I is the ratio consumed. However, the values were obtained by determining the ratio of $$SrCl_2:Cr_2O_7$$

in the filtrate and calculating therefrom the ratio of the reactants consumed. The chromium was determined in the filtrate and filter cake by the iodine-sodium thiosulfate method. Residual strontium chloride in the filtrate was determined by flame spectrophotometry.

Examples 1 to 4, as set out in Table I, show the effect of variations in the amount of sodium hydroxide on the precipitation of the strontium chromate. Examples 1 to 4 employ the mole ratio of about 2 strontium chloride to 1 sodium dichromate, the actual ratio being 1.99:1. The sodium hydroxide was provided by a 2 normal aqueous solution. The amount of NaOH was varied being 100 percent of the stoichiometric quantity required by Equation 2 above, in Example 1, 110 percent in Example 2, and 120 percent in Example 3.

Since Example 4 shows the mole ratio of the strontium chloride and $(Cr_2O_7)$ consumed to be more nearly the 1.99:1 ratio employed, it may be concluded that the best results were obtained when the dichromate was mixed externally with the stoichiometric quantity of caustic soda required by Equation 2.

Tests were run on the filter cake produced in Examples 1–4, to determine the magnesium content. The tests showed that the magnesium therein increased progressively in Examples 1 to 3. The increase appears to be due to the increase in the excess of sodium hydroxide present. The magnesium present in Example 1 was insignificant and only a trace was present in Example 4. Tests made to determine the potassium and lithium in Examples 1–4 showed none present. Tests for sodium showed a trace amount only.

A second series, consisting of Examples 5, 6 and 7, was made to determine the effect on the $SrCrO_4$, recovered by varying the molar ratio of strontium chloride to $(CrO_4)$. The procedure followed was in general the same as that in Examples 1–4. The molar ratio of $SrCl_2$ to $(Cr_2O_7)$ was increased from 1.99:1 employed in Example 5 to 2.49:1 in Example 7. Stoichiometric quantities of the dichromate and the sodium hydroxide required for reaction with each other were admixed externally for each of the examples. The amount of the brine and the strength thereof were the same as those employed in the previous examples. The amount of sodium hydroxide and the dichromate reaction mixture was decreased in Examples 5 through 7 so that the sodium chromate contained therein decreased from 100 percent of the stoichiometric quantity required to react with the strontium values in Example 5 to only 80 percent thereof in Example 7. The results are set out in Table II below:

TABLE II

| Example No. | 5 | 6 | 7 |
|---|---|---|---|
| Brine, in ml | 200 | 200 | 200 |
| $SrCl_2$, in gm | 6.80 | 6.80 | 6.80 |
| $Na_2Cr_2O_7 \cdot 2H_2O$, in gm | 6.43 | 5.79 | 5.14 |
| $(Cr_2O_7)$, in percent of stoichiometric | 100 | 90 | 80 |
| Mole ratio of $\frac{SrCl_2}{(Cr_2O_7)}$ | 1.99:1 | 2.21:1 | 2.49:1 |
| NaOH, 2N, in ml | 21.6 | 19.4 | 17.3 |
| NaOH, in percent of stoichiometric | 100 | 90 | 80 |
| (a) Filtrate Analysis: | | | |
| $(Cr_2O_7)$ loss, in gm | 0.521 | 0.285 | 0.107 |
| $Cr_2O_7$ loss, in percent | 8.1 | 4.9 | 2.08 |
| $SrCl_2$ loss, in percent | 12.0 | 17.2 | 23.3 |
| Mole ratio of $\frac{SrCl_2}{(Cr_2O_7)}$ consumed [1] | 1.91:1 | 2.14:1 | 2.44:1 |
| (b) Filter Cake Analysis: | | | |
| Ba, Li, K in filter cake | Nil in all examples for which tested | | |

[1] As calculated from determination in filtrate.

Examples 5, 6 and 7, as set out in Table II above, show the following facts: (1) the chromium loss in the filtrate decreases as the percent of the stoichiometric quantity of the $SrCl_2$ required to react with the dichromate-hydroxide increases, or conversely, as the ratio of the dichromate-hydroxide to the strontium chloride decreases. The effect of such loss is illustrated by the greater percent loss of the $(Cr_2O_7)$ in Example 5 in contrast to the lower $(Cr_2O_7)$ loss in Example 7. The excess residual strontium chloride apparently depresses the solubility of strontium chromate and results in a higher recovery in the precipitate. (2) The molar ratio of the $SrCl_2$ to $(Cr_2O_7)$ consumed (as measured by calculations based upon the actual ratio existing in the filtrate) more nearly approaches the actual molar ratio existing, e.g., 2.44:1 as contrasted to the 2.49:1 ratio actually added in Example 7. The presence of contaminants Ba, K, and Li was not detectable. Optimum operating conditions will depend, therefore, upon whether or not the $SrCl_2$ or the $(Cr_2O_7)$ loss is the more serious.

A third series of runs, consisting of Examples 8, 9 and 10, was run to show the effect of temperature on the recovery of strontium chromate from strontium chloride brine. In each of these examples the dichromate and hydroxide were admixed in the stoichiometric quantities required by Equation 2 and then with 100 percent of the stoichiometric amount of the $Na_2CrO_4$ produced thereby, required to react with the $SrCl_2$ present according to Equation 3, as in Examples 5, 6 and 7. 200 milliliter samples of the brine employed in the examples were prepared according to the procedure followed therein except they were heated to the temperatures set out in Table III below. A digestion period of 15 minutes was used in each of the examples of Table III and the filter cakes thus produced were washed as above with 75 milliliters of distilled water which had been previously heated to approximately the temperature of the precipitate.

TABLE III

| Example No. | 8 | 9 | 10 |
|---|---|---|---|
| Temperature, in ° C | 25 | 65 | 100 |
| ($Cr_2O_7$) loss, in gm | 1.597 | 0.597 | 0.521 |
| ($Cr_2O_7$) loss, in percent | 24.8 | 9.3 | 8.1 |

The results of Table III show that the solubility of strontium chromate, although unexpected, is inversely related to increased temperature. An examination of Examples 8, 9 and 10 in Table III, definitely show that the higher temperatures result in a lower chromate loss.

A fourth series of runs, Examples 11, 12 and 13, was made to show the effect of the period of digestion time on the recovery of strontium chromate from strontium chloride brine. The method was that followed generally above except for a variation in time. In each of these three runs the dichromate-caustic reaction mixture was prepared by admixing the amounts thereof according to Equation 2 and then admixing 100 percent of the stoichiometric amount thereof required to react with the strontium values in the brine according to Equation 3, the temperature being held at 65° C. The filter cakes were washed with 75 milliliters of water heated to 65° C. The results are shown in Table IV.

TABLE IV

| Example No. | 11 | 12 | 13 |
|---|---|---|---|
| Time, in min | 5 | 15 | 60 |
| ($Cr_2O_7$), in gm. in filtrate | 0.730 | 0.597 | 0.484 |
| ($Cr_2O_7$), in percent loss in filtrate | 11.4 | 9.3 | 7.5 |

The results set out in Table IV show that the chromium loss is less and consequently the recovery of strontium chromate is greater with increasing digestion time. This is thought to be due to the possible precipitation of small amounts of magnesium hydroxide in the initial part of the digestion period which has a temporary adverse effect upon the dichromate-to-chromate reaction. However, after digestion has continued for a matter of minutes, the percentage of the magnesium hydroxide precipitated is so small in relation to the chromate present that its effect is substantially reduced.

The following series of runs, Examples 14 to 18, were made to show the effects of variations in (*a*) strength of a sodium chromate solution (in contrast to the dichromate-caustic solution above) and (*b*) rate of addition of the sodium chromate solution to the strontium salt-containing brine. These examples employed a reaction vessel and procedure similar to those employed in the previous examples. Quantities, temperatures, digestion periods, concentration of the reactants, percentages, and rates of addition of reactants are all set out in Table V below. Examples 14 and 15 were made to show the effect of varying the concentration of the sodium chromate solution but adding the same amount of $Na_2CrO_4$ in each example. Examples 16 and 17 were made to show the effect of variations in the rate of addition of the soduim chromate solution. Example 18 was made to show the effect of varying the digestion period. The brine employed in Examples 14 to 18 contained 2.59 percent strontium chloride. Other halides were present in the brines employed in these examples in approximately the same percentages as in the previous examples. In Examples 14 to 18 the strontium chromate was added in an amount which was 80 percent of the stoichiometric quantity required to react with the strontium values in the brine.

TABLE V

| Example No. | 14 | 15 | 16 | 17 | 18 |
|---|---|---|---|---|---|
| Brine, in ml | 400 (514 gm.) | 400 (514 gm.) | 400 (514 gm.) | 400 (514 gm.) | 400 (514 gm.) |
| $Na_2CrO_4$ solution, in percent | 5 | 15 | 15 | 15 | 15 |
| $Na_2CrO_4$ solution, in ml | 207 | 63.8 | 63.8 | 63.8 | 63.8 |
| $Na_2CrO_4$, in gram | 10.88 | 10.88 | 10.88 | 10.88 | 10.88 |
| Temperature, in °C | 103–104 | 103–104 | 104–105 | 104–105 | 95–105 |
| $Na_2CrO_4$ addition, in min | 1 | 1 | 15 | 1.4 | 1 |
| Digestion time, in min | 29 | 29 | ---------- | 13.6 | 120 |
| Filtrate Analysis: | | | | | |
| $Na_2CrO_4$, percent precipitated | 89.9 | 95.0 | 90.8 | 94.2 | 95.8 |
| $SrCl_2$, percent precipitated | 67.7 | 71.3 | 68.4 | 68.7 | 74.2 |
| Filter Cake Analysis, washed and dried: | | | | | |
| $CrO_3$, in percent | 50.1 | 50.3 | 49.2 | 49.7 | 50.3 |
| $SrCrO_4$, in percent | 92.3 | 91.8 | 90.4 | 87.6 | 93.9 |
| $CaCrO_4$, in percent | 8.31 | 8.25 | 9.88 | 11.1 | 6.31 |

The following conclusions can be based upon the results as set out in Table V: (1) a 15 percent sodium chromate solution gave better results than did the 5 percent solution in that a higher strontium chromate loss was realized as shown by 95 percent recovery when 15 percent $Na_2CrO_7$ solution was used in contrast to 89.8 percent recovery when the 5 percent solution was used. The strontium chromate precipitates were substantially identical in purity when either 5 percent or 15 percent sodium chromate solution was used; (2) rapid addition of the sodium chromate solution is favored over slow addition thereof because of the higher $SrCrO_4$ recovery as shown by a recovery of 94.2 percent when added rapidly in contrast to 90.8 percent recovery when 15 minutes were used in adding the $Na_2CrO_4$ solution. The rapid addition, however, was accompanied by a higher percent of Ca with the $SrCrO_4$; (3) the digestion time appears to be important since the longer time of 2 hours produced a product containing calcium equivalent to 6–7 percent calcium chromate. This work indicates that at least one hour digestion time should be used. There does not appear to be an appreciable advantage in using a digestion period greater than 2 hours. Agitation, which is adequate to effect thorough mixing, should be provided during the digestion period.

For the purposes of comparing $SrCrO_4$ prepared according to the invention and substantially pure $SrCrO_4$, X-ray diffraction patterns were obtained of each. The X-ray pattern for each showed them to have the same structure but the pattern of the $SrCrO_4$ prepared according to the invention had a contracted lattice, i.e., some smaller Ca atoms were shown to be substituted for the Sr atoms in the lattice of the $SrCrO_4$ crystals. For a large number of purposes, the presence of the Ca atoms interlocked in the crystals, is inconsequential. The presence of such Ca ions as a separate compound apart from the $SrCrO_4$ would, on the other hand, be definitely detrimental for many uses thereof.

If it is considered that the Ca atoms present in the $SrCrO_4$ product of the invention are undesirable, over 90 percent thereof can be converted to Sr atoms by the following procedure:

Hydrochloric acid, usually a 1 to 10 N, is admixed with the $SrCrO_4$ product in sufficient amount to convert it to the dichromate. A soluble strontium salt, e.g., $SrCl_2$, is then admixed therewith in an amount which is at least equivalent to, and preferably in excess of the Ca content of the $SrCrO_4$ crystals in the precipitate, and thereafter a sufficient amount of an alkali metal hydroxide to neutralize the acid therein is admixed therewith. Sample C of Example 19 which follows, illustrates the substitution of Sr atoms for substantially all the Ca atoms in $SrCrO_4$ prepared according to the invention.

*Example 19*

Three samples of $SrCrO_4$ designated A, B and C below, prepared according to the invention, were treated as follows:

(A) No $SrCl_2$ was admixed with the $SrCrO_4$.

(B) 100 ml. of water and $SrCl_2$ in an amount equivalent to the estimated Ca content were admixed with the $SrCrO_4$ and maintained at 100° C. for 60 minutes, and thereafter filtered, washed, and dried at between 130° and 140° C.

(C) 3 N hydrochloric acid was admixed with the $SrCrO_4$ in sufficient amount to convert the chromate to the dichromate; $SrCl_2$ in an amount equivalent to the estimated Ca content was admixed therewith; an aqueous solution of 2 N NaOH was admixed therewith in sufficient amount to neutralize the acid therein, and maintained at 100° C. for 60 minutes; thereafter the reaction mixture was filtered and the precipitate obtained washed and dried at between 130° and 140° C.

The three samples thus prepared were analyzed for the components set forth in Table VI below:

TABLE VI

[Digestion period of 60 minutes at 100° C.]

| Sample Designation of Example 19 | A | B | C[1,2] |
|---|---|---|---|
| Weight of sample, in gm | 20.007 | 20.021 | 20.010 |
| Water added, in ml | 100 | 100 | (3) |
| HCl, 3 N, added, in ml | None | None | 35.7 |
| $SrCl_2$ added, in gm | None | 1.35 | 1.05 |
| NaOH, 2 N, added, in ml | None | None | 53.7 |
| $SrCrO_4$, in percent | 9.30 | 94.0 | 97.4 |
| $CaCrO_4$, in percent | 6.99 | 6.03 | 0.28 |
| $CrO_3$, in percent | 50.3 | 50.3 | 47.90 |

[1] 2.3 percent NaCl, present in Sample C, had not been fully removed by washing. It can be removed if desired. However, the presence of the NaCl does not detract from the general utility of the product.

[2] An analysis of the filtrate of Sample C showed that 94.6 percent of the $SrCl_2$ had reacted with the Ca contained in the original $SrCrO_4$ product and was thereby removed.

[3] The water contained in the 3 N HCl and 2 N NaOH was adequate without further addition of water.

An evaluation of the results of Example 19 set out in Table VI, shows that the calcium atoms found in the $SrCrO_4$ crystals prepared according to the invention, can, if it be so desired, readily largely removed by the treatment applied to Sample C.

For the purposes of showing the contrast between commercially available $SrCrO_4$ and the $SrCrO_4$ produced according to the invention, the following analysis was run on samples of each of two of such commercially available $SrCrO_4$ products designed as shown:

| | Pure Grade | Pigment Grade |
|---|---|---|
| $CaCrO_4$, in percent | 1.15 | 0.86 |
| $Na_2CrO_4$, in percent | 0.34 | 1.98 |
| Ba, in percent | 0.60 | 0.60 |
| $CrO_3$, in percent | 46.20 | 46.60 |

The high Ba content and the appreciably lower $CrO_3$ content of the $SrCrO_4$ now available in contrast to the $SrCrO_4$ prepared according to the invention clearly show the inferiority of presently available $SrCrO_4$. Since the strontium ores, from which presently available chromates are prepared, contains little calcium, it is to be expected that the Ca content is low. However, as stated hereinbefore, the Ca atoms in the $SrCrO_4$ crystalline lattice of $SrCrO_4$ prepared according to the invention little affects solubility or other properties of the $SrCrO_4$ product, and furthermore, can be removed as above described. The high barium content of presently available $SrCrO_4$, on the other hand, is highly undesirable. Particularly important is the lower $CrO_3$ analysis of commercially available $SrCrO_4$ which is an indicium of a less valuable product since the $CrO_3$ analysis largely determines the value of $SrCrO_4$ compounds of otherwise comparable quality.

Having described the invention, what is claimed and desired to be protected by Letters Patent is:

1. The method of making strontium chromate from a brine containing a strontium salt intermixed with other salts including calcium salts in a ratio of Ca:Sr of not over 20:1 dissolved therein consisting of admixing with the brine an aqueous solution of a soluble chromate in an amount between 80 and 100 percent of the stoichiometric quantity required to react with the strontium values present at a temperature of between 90° and 110° C., digesting the resulting mixture for at least 5 minutes to precipitate strontium chromate, and separating and washing the thus precipitated strontium chromate.

2. The method of claim 1, wherein the soluble chromate is sodium chromate and the period of time of reaction is at least 30 minutes.

3. The method of claim 1 wherein the dichromate and the hydroxides are selected from the dichromates and the hydroxides of the alkali metals and ammonium and are present in substantially the stoichiometric quantities thereof necessary to interact to convert the dichromate to the chromate.

4. The method of claim 1 wherein the dichromate and the hydroxide are admixed externally prior to their being admixed with the strontium salt-containing brine.

5. The method of claim 1 wherein the aqueous solution of the dichromate and hydroxide have a concentration of at least 15 percent by weight and are employed in an amount sufficient to provide about 90 percent of the stoichiometric quantity the chromate required to react with the strontium values in the brine.

6. The method of claim 1 wherein the strontium chromate precipitate produced has the calcium content thereof substantially reduced by admixing therewith 1 to 10 N hydrochloric acid in sufficient amount to convert the chromate to the dichromate in solution, admixing therewith a soluble strontium salt in an amount at least substantially equivalent to the calcium present in said chromate precipitate, neutralizing the resulting strontium-enriched dichromate with a 1 to 10 N aqueous solution of an hydroxide to produce a purified strontium chromate precipitate, and separating the purified precipitate thus produced.

7. The method of claim 1 wherein the temperature is between 60° and 100° C.

References Cited in the file of this patent

Mellor: A Comprehensive Treatise on Inorganic and Theoretical Chemistry, vol. 11, pp. 270, 328, Longmans, Green and Co. (1931).

Lange: Handbook of Chemistry, 8th Ed. (1952), Handbook Publishers, Inc., pp. 214, 215, 296, 297.